(12) United States Patent  
Somanath et al.

(10) Patent No.: US 7,762,087 B2  
(45) Date of Patent: Jul. 27, 2010

(54) ROTATABLE INTEGRATED SEGMENTED MID-TURBINE FRAMES

(75) Inventors: Nagendra Somanath, Manchester, CT (US); Keshava B. Kumar, South Windsor, CT (US); William A. Sowa, Simsbury, CT (US); Christopher Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 899 days.

(21) Appl. No.: 11/634,630

(22) Filed: Dec. 6, 2006

(65) Prior Publication Data

US 2008/0134688 A1 Jun. 12, 2008

(51) Int. Cl.  
*F02C 7/20* (2006.01)

(52) U.S. Cl. .............................. 60/797; 60/796; 60/798; 415/139; 415/142; 415/213.1; 415/191; 415/209.2; 415/209.3; 415/209.4; 415/210.1

(58) Field of Classification Search ........... 60/796–798; 415/139, 142, 213.1, 191, 209.2–4, 210.1  
See application file for complete search history.

(56) References Cited

U.S. PATENT DOCUMENTS

| 6,708,482 | B2 | 3/2004 | Seda |
| 6,883,303 | B1 | 4/2005 | Seda |
| 7,594,404 | B2 * | 9/2009 | Somanath et al. ............. 60/796 |

* cited by examiner

*Primary Examiner*—Michael Cuff  
*Assistant Examiner*—Craig Kim  
(74) *Attorney, Agent, or Firm*—Kinney & Lange, P.A.

(57) ABSTRACT

A mid-turbine frame connected to at least one mount of a gas turbine engine transfers a first load from a first bearing and a second load from a second bearing to the mount. The mid-turbine frame includes a load transfer unit, a torque box rotatably positioned within the load transfer unit, and a plurality of struts. The load transfer unit has a first locking element and combines the first load and the second load into a combined load. The torque box has a second locking element that is engagable with the first locking element of the load transfer unit. The plurality of struts are connected between the torque box and the mount, and transfer the combined load from the torque box to the mount. The first locking element and the second locking element are at least one of a rib or a groove.

18 Claims, 7 Drawing Sheets

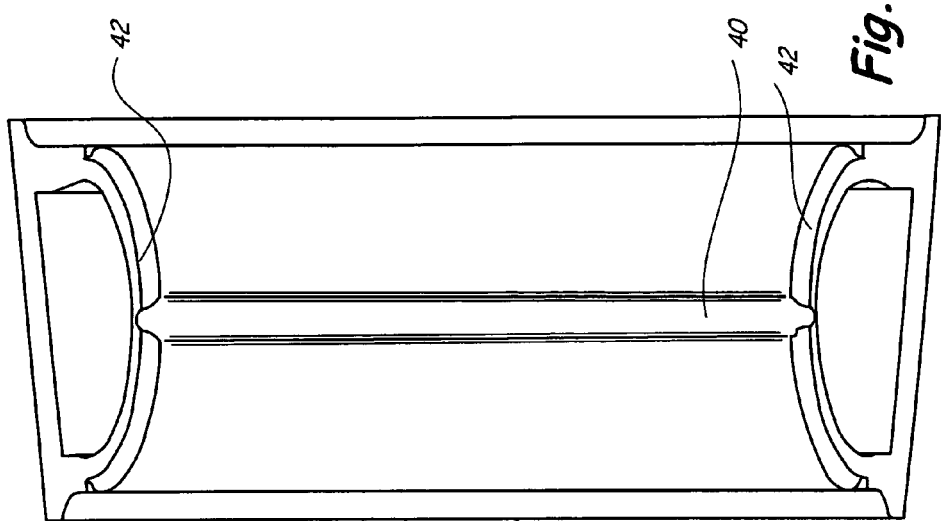
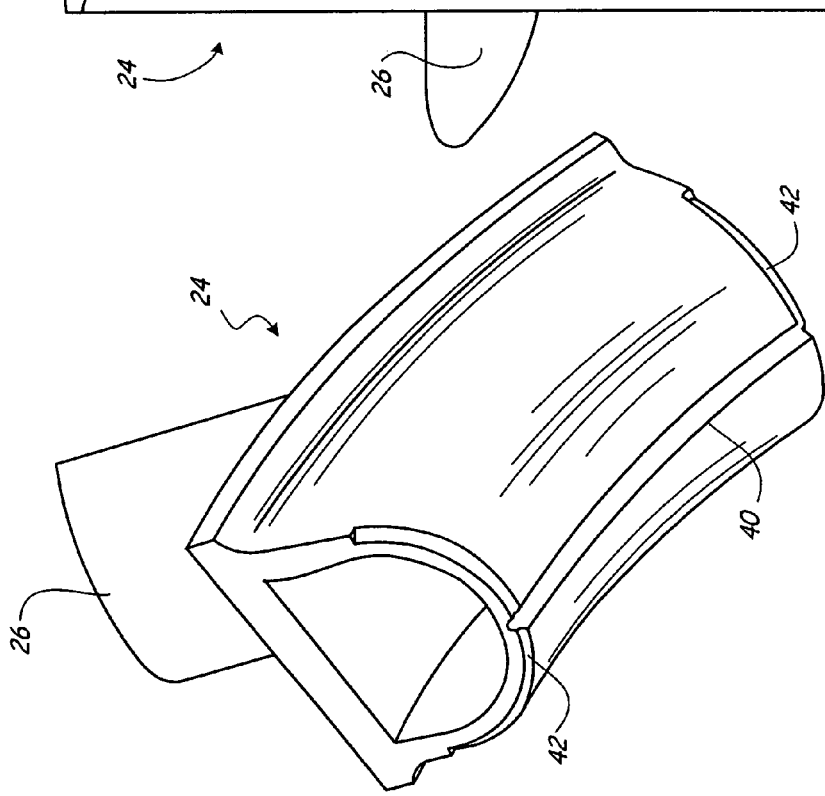

ROTATABLE INTEGRATED SEGMENTED MID-TURBINE FRAMES

BACKGROUND OF THE INVENTION

The present invention generally relates to the field of gas turbine engines. In particular, the invention relates to a mid-turbine frame for a jet turbine engine.

Turbofans are a type of gas turbine engine commonly used in aircraft, such as jets. The turbofan generally includes a high and a low pressure compressor, a high and a low pressure turbine, a high pressure rotatable shaft, a low pressure rotatable shaft, a fan, and a combuster. The high-pressure compressor (HPC) is connected to the high pressure turbine (HPT) by the high pressure rotatable shaft, together acting as a high pressure system. Likewise, the low pressure compressor (LPC) is connected to the low pressure turbine (LPT) by the low pressure rotatable shaft, together acting as a low pressure system. The low pressure rotatable shaft is housed within the high pressure shaft and is connected to the fan such that the HPC, HPT, LPC, LPT, and high and low pressure shafts are coaxially aligned.

Outside air is drawn into the jet turbine engine by the fan, the LPC, and the HPC, which increases the pressure of the air drawn into the system. The high pressure air then enters the combuster, which burns fuel and emits the exhaust gases. The HPT directly drives the HPC using the fuel by rotating the high pressure shaft. The LPT uses the exhaust generated in the combuster to turn the low pressure shaft, which powers the fan to continually bring air into the system. The air brought in by the fan bypasses the HPT and LPT and acts to increase the engine's thrust, driving the jet forward.

In order to support the high and low pressure systems, bearings are located within the jet turbine engine to help distribute the load created by the high and low pressure systems. The bearings are connected to an engine casing that houses a mid-turbine frame located between the HPT and the LPT by bearing support structures. The bearing support structures can be, for example, bearing cones. The loads from the bearing support structures are transferred to the engine casing through the mid-turbine frame. Decreasing the weight of the engine casing can significantly increase the efficiency of the jet turbine engine and the jet itself.

BRIEF SUMMARY OF THE INVENTION

A mid-turbine frame connected to at least one mount of a gas turbine engine transfers a first load from a first bearing and a second load from a second bearing to the mount. The mid-turbine frame includes a load transfer unit, a torque box rotatably positioned within the load transfer unit, and a plurality of struts. The load transfer unit has a first locking element and combines the first load and the second load into a combined load. The torque box has a second locking element that is engagable with the first locking element of the load transfer unit. The plurality of struts are connected between the torque box and the mount, and transfer the combined load from the torque box to the mount. The first locking element and the second locking element are at least one of a rib or a groove.

BRIEF DESCRIPTION OF THE DRAWINGS

FIG. 5A is an enlarged, perspective view of a torque box of the mid-turbine frame.

FIG. 5B is an enlarged, bottom view of the torque box of the mid-turbine frame.

DETAILED DESCRIPTION

Figure 1:
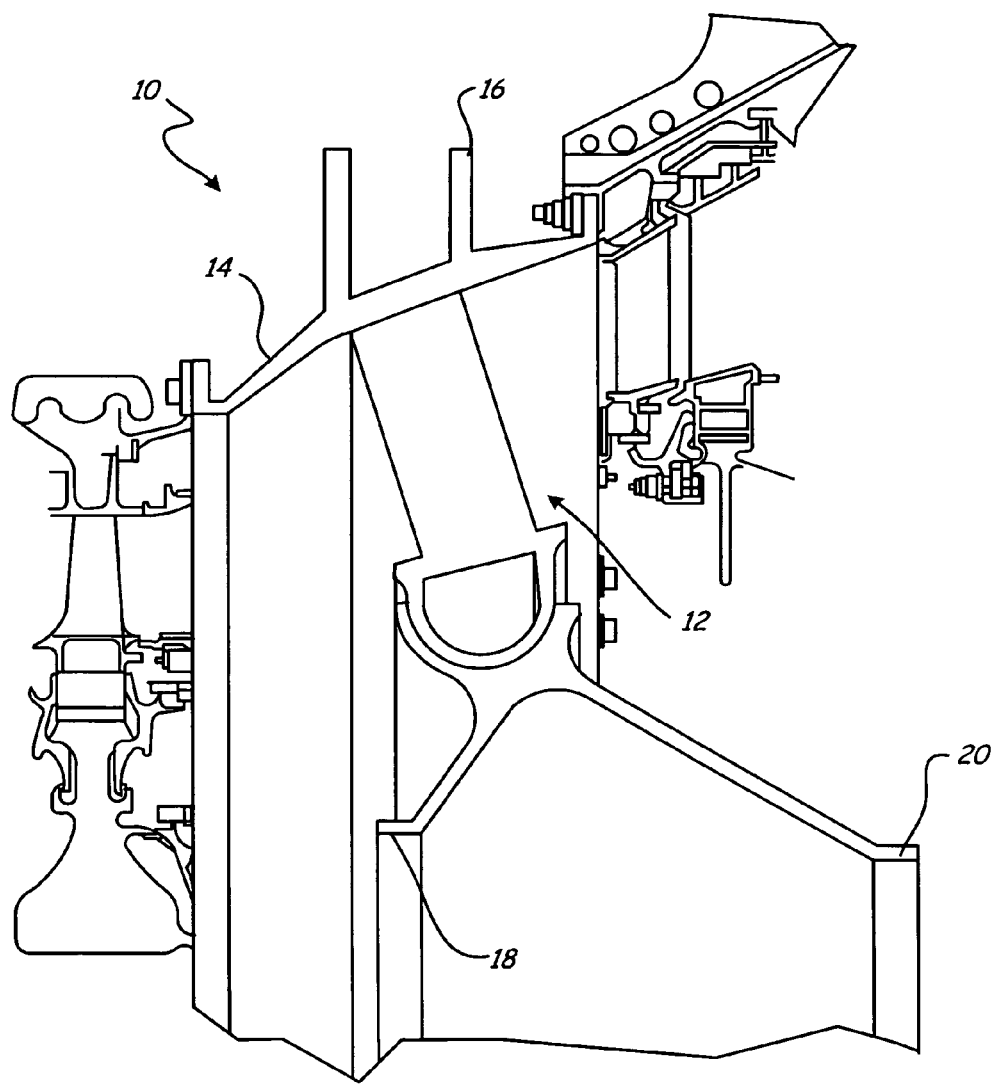
FIG. 1 is a partial sectional view of an intermediate portion of a gas turbine engine.

FIG. 1 shows a partial sectional view of an intermediate portion of a gas turbine engine 10 about a gas turbine engine axis centerline. Gas turbine engine 10 generally includes mid-turbine frame 12, engine casing 14, mounts 16, first bearing 18, and second bearing 20. The design of mid-turbine frame 12 of gas turbine engine 10 efficiently transfers loads from first and second bearings 18 and 20 through mid-turbine frame 12 to engine casing 14. Mid-turbine frame 12 has a rotatable, integrated, and segmented design that acts as a stiffness driver within gas turbine engine 10.

Mid-turbine frame 12 is housed within engine casing 14 of gas turbine engine 10 and is connected to engine casing 14 and first and second bearings 18 and 20. Engine casing 14 protects mid-turbine frame 12 from its surroundings and transfers the loads from mid-turbine frame 12 to mounts 16. Due to the design of mid-turbine frame 12, mid-turbine frame 12 is lightweight and easily manufacturable, allowing it to be integrated within engine casing 14 during assembly.

First and second bearings 18 and 20 are located at forward and aft ends of gas turbine engine 10, respectively, below mid-turbine frame 12. First and second bearings 18 and 20 support thrust loads, vertical tension, side gyroscopic loads, as well as vibratory loads from high and low pressure rotors located in gas turbine engine 10. All of the loads supported by first and second bearings 18 and 20 are transferred to engine casing 14 and mounts 16 through mid-turbine frame 12. Second bearing 20 is typically designed to support a greater load than first bearing 18, so mid-turbine frame 12 is designed for stiffness and structural feasibility assuming that second bearing 20 is the extreme situation.

Figure 2:
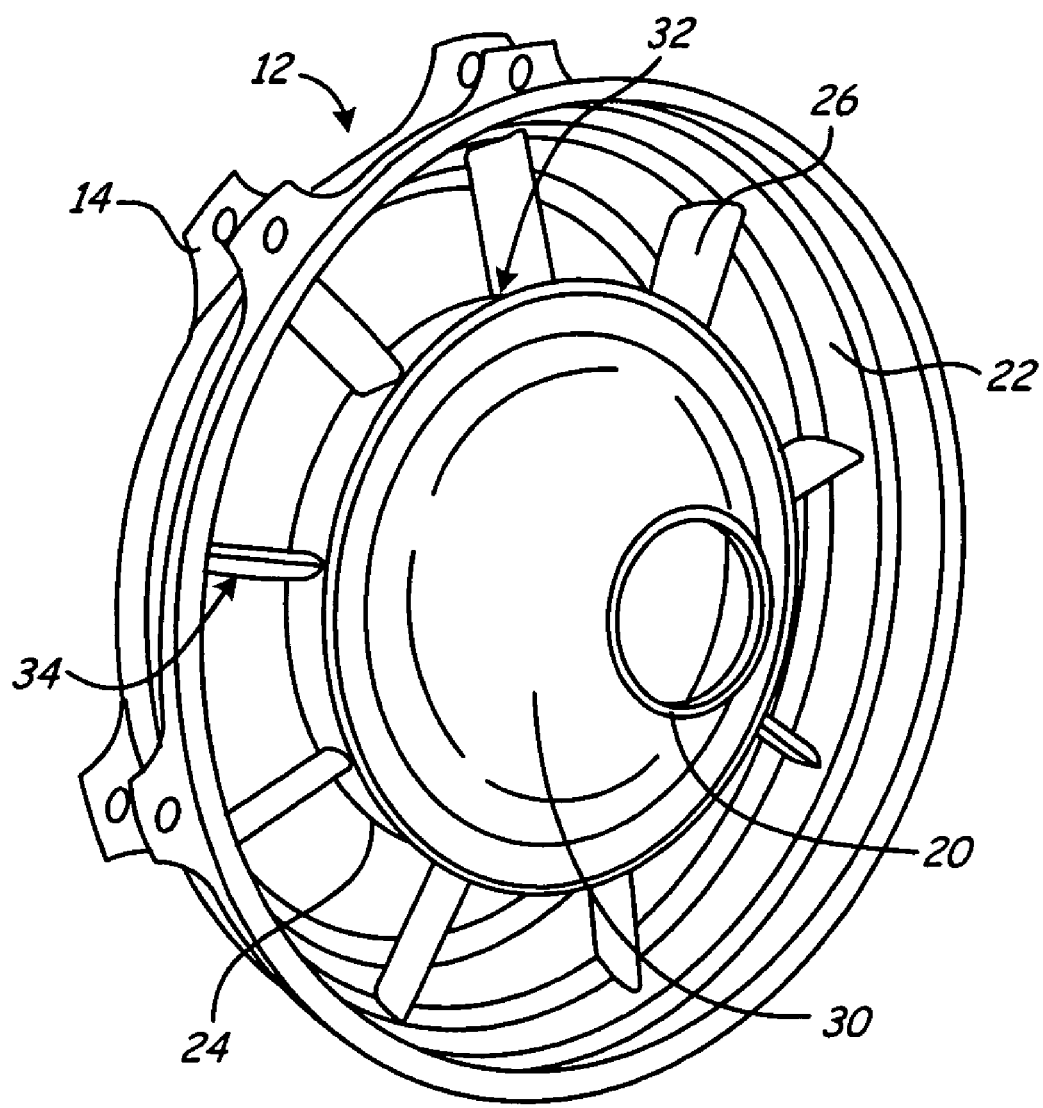
FIG. 2 is a perspective view of a mid-turbine frame.
Figure 3:
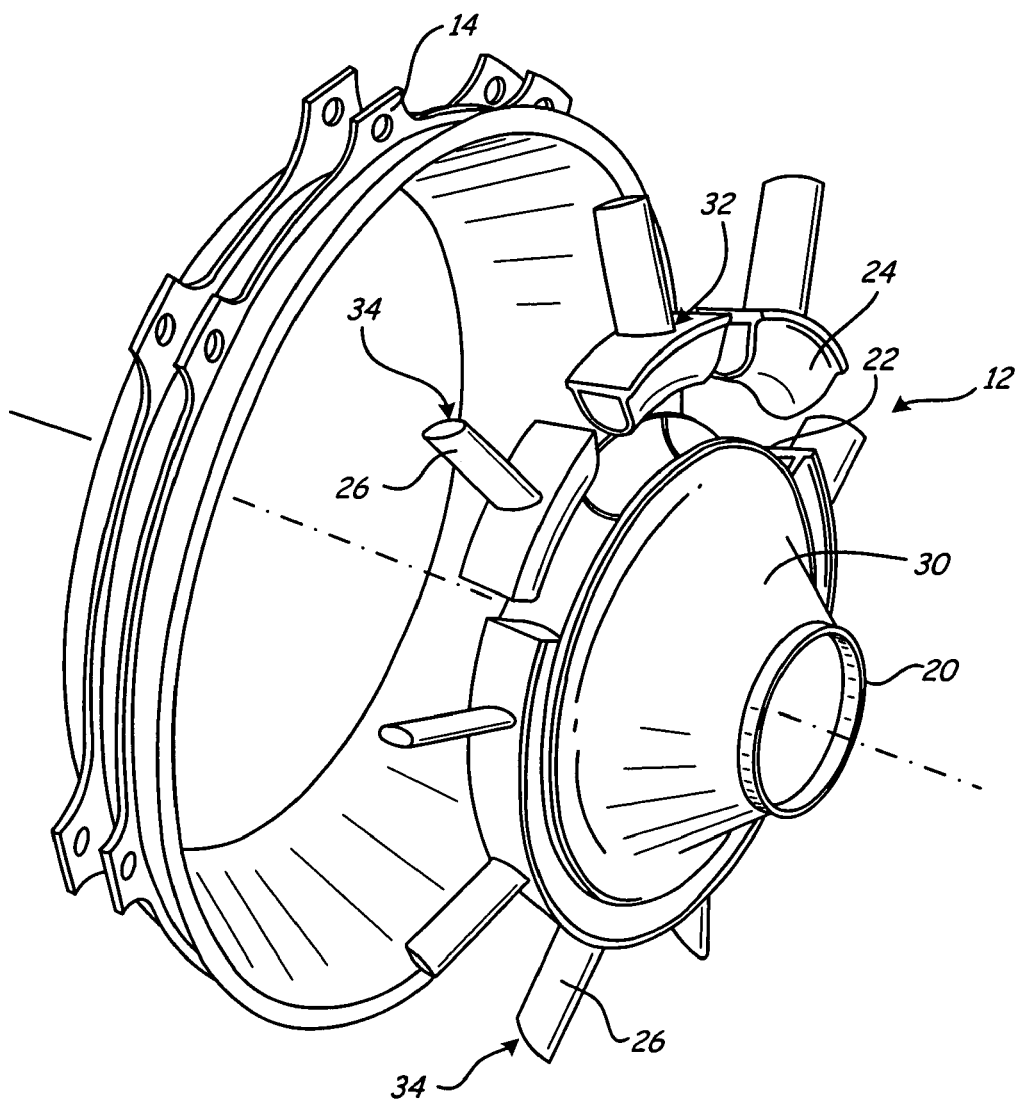
FIG. 3 is an exploded perspective view of the mid-turbine frame.

FIGS. 2 and 3 show a perspective view and an exploded view of mid-turbine frame 12, respectively, and will be discussed in conjunction with one another. Mid-turbine frame 12 has a segmented ring structure and generally includes load transfer unit 22, plurality of torque boxes 24, and plurality of struts 26. Each segment of mid-turbine frame 12 includes a torque box 24 which connects a strut 26 to load transfer unit 22. First and second bearings 18 and 20 (shown in FIG. 1) are connected to load transfer unit 22 of mid-turbine frame 12 by first bearing cone 28 and second bearing cone 30 (shown in FIG. 4), respectively. First and second bearing cones 28 and 30 are stationary relative to continuously rotating high and low pressure rotors. Because mid-turbine frame 12 is segmented, torque boxes 24 and struts 26 can be manufactured separately from load transfer unit 22, simplifying manufacturing.

Load transfer unit 22 is U-shaped and combines the loads from first bearing cone 28 and second cone 30. First and second bearing cones 28 and 30 transfer the loads from first bearing 18 and second bearing 20 (shown in FIG. 1) to load transfer unit 22. After the loads are combined, load transfer unit 22 transfers the combined load to torque box 24. Torque boxes 24 are adjustable and rotatable within load transfer unit 22, allowing efficient transfer of the loads from first and second bearings 18 and 20 to torque boxes 24 and struts 26.

Each torque box 24 has a shell structure and is positioned between load transfer unit 22 and struts 26. Torque box 24 takes the combined load, or torque, from load transfer unit 22 and transfers the load to struts 26, which extend from along the circumference of torque box 24.

Struts 26 of mid-turbine frame 12 extend from torque boxes 24 and transfer the loads from first and second bearing cones 28 and 30 entering through load transfer unit 22 and torque box 24 to engine casing 14. Each of struts 26 has a first end 32 connected to a torque box 24 and a second end 34 connected to engine casing 14. The loads travel from load transfer unit 22 through torque box 24 and struts 26 to engine casing 14. In one embodiment, nine struts are positioned approximately forty degrees apart from one another along the circumference of torque box 24. In another embodiment, twelve total struts are positioned approximately thirty degrees apart from one another along the circumference of torque box 24. Although FIGS. 2 and 3 depict struts 26 as perpendicular with respect to torque box 24, struts 26 may also be tilted with respect to torque box 24 without departing from the intended scope of the present invention.

Figure 4:
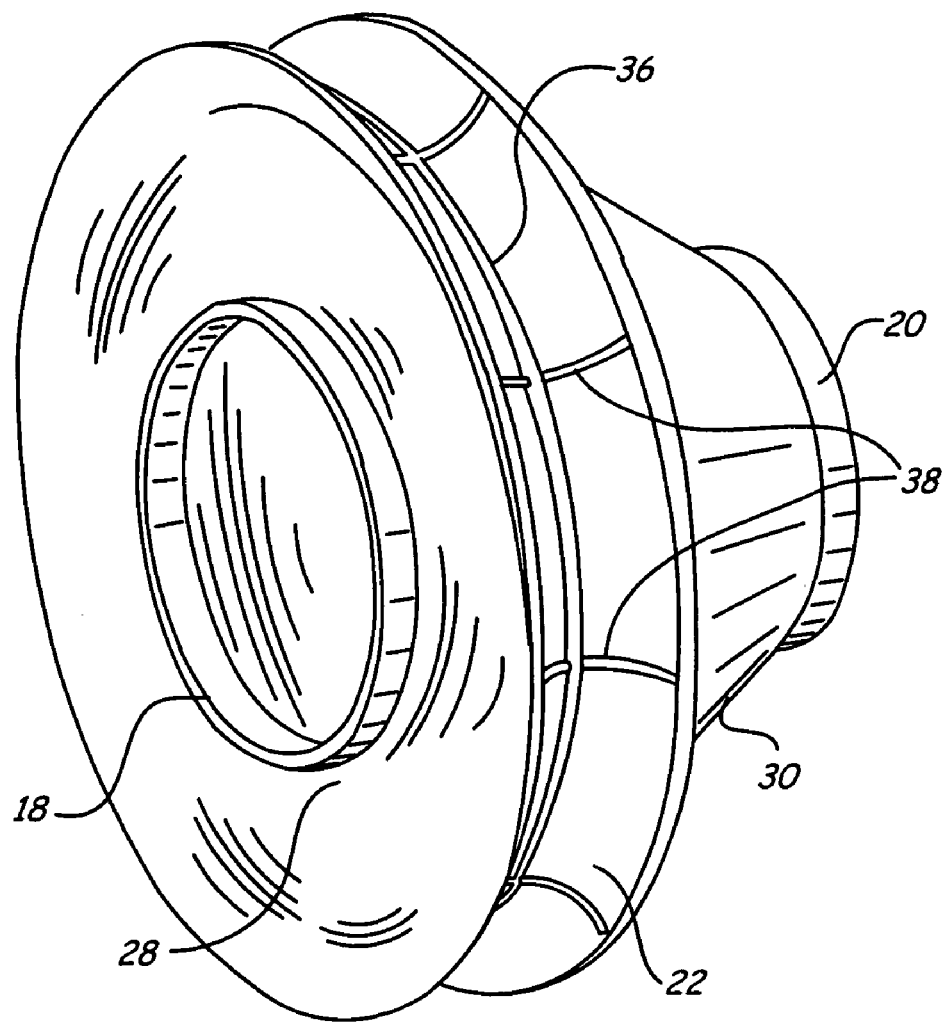
FIG. 4 is a perspective view of a load transfer unit of the mid-turbine frame.

FIG. 4 shows a perspective view of load transfer unit 22 of mid-turbine frame 12 (shown in FIGS. 2 and 3). Load transfer unit 22 is U-shaped and is connected to first bearing cone 28 and second bearing cone 30. The loads from first and second bearing cones 28 and 30 are equalized and introduced into load transfer unit 22 at the base of the U-shape of load transfer unit 22, which carries the effective load. As can be seen in FIG. 4, load transfer unit 22 has a contact rib or lip 36 in the circumferential direction and a plurality of equally spaced locking ribs or lips 38 extending axially around mid-turbine frame 12. Although FIG. 4 depicts load transfer unit 22 as having only one circumferential contact rib 36, load transfer unit 22 may have a plurality of circumferential contact ribs 36 without departing from the intended scope of the present invention.

FIGS. 5A and 5B show an enlarged bottom view and an enlarged, perspective view of a torque box 24 of mid-turbine frame 12 (shown in FIGS. 2 and 3), and will be discussed in conjunction with one another. Each torque box 24 is U-shaped and takes the combined load from load transfer unit 22 to struts 26. The U-shape of each torque box 24 acts as a local stiffener in the circumferential direction for engine casing 14 (shown in FIGS. 2 and 3) and leads to increased local membrane-bending stiffness, enabling local stress redistribution and transfer from struts 26 to engine casing 14. As can be seen in FIGS. 5A and 5B, torque box 24 has a contact groove 40 in the circumferential direction along the base of the U-shape as well as locking grooves 42 in the axial direction at each end of torque box 24. Contact groove 40 and locking grooves 42 are engagable with contact rib 36 and locking ribs 38 of load transfer unit 22, respectively. Although FIGS. 5a and 5B depicts torque box 24 as having only one circumferential contact groove 40, torque box 24 may have a plurality of circumferential contact grooves 40 without departing from the intended scope of the present invention.

Figure 6:
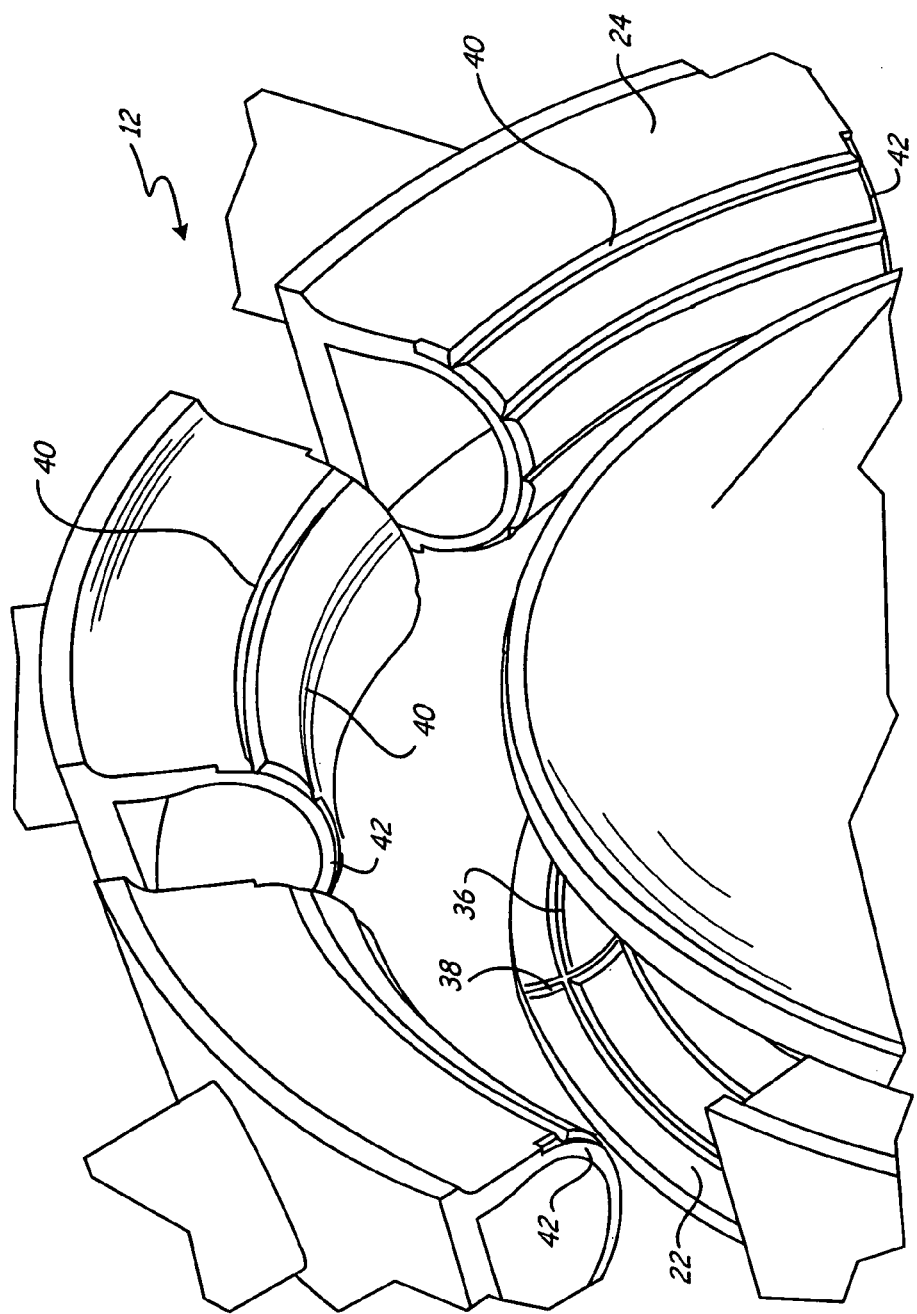
FIG. 6 is an enlarged, exploded view of an alternative embodiment of the mid-turbine frame.

FIG. 6 shows an enlarged, exploded view of an alternative embodiment of mid-turbine frame 12. As previously mentioned in the discussion of FIGS. 4, 5A, and 5B, load transfer unit 22 may have a plurality of contact ribs 36 and torque boxes 24 may have a plurality of contact grooves 40. Load transfer unit 22 and torque boxes 24 may have any number of contact ribs 36 and contact grooves 40, respectfully. However, there must be at least as many contact grooves 40 as there are contact ribs 36 in order to ensure proper engagement of torque boxes 24 with load transfer unit 22.

Figure 7:
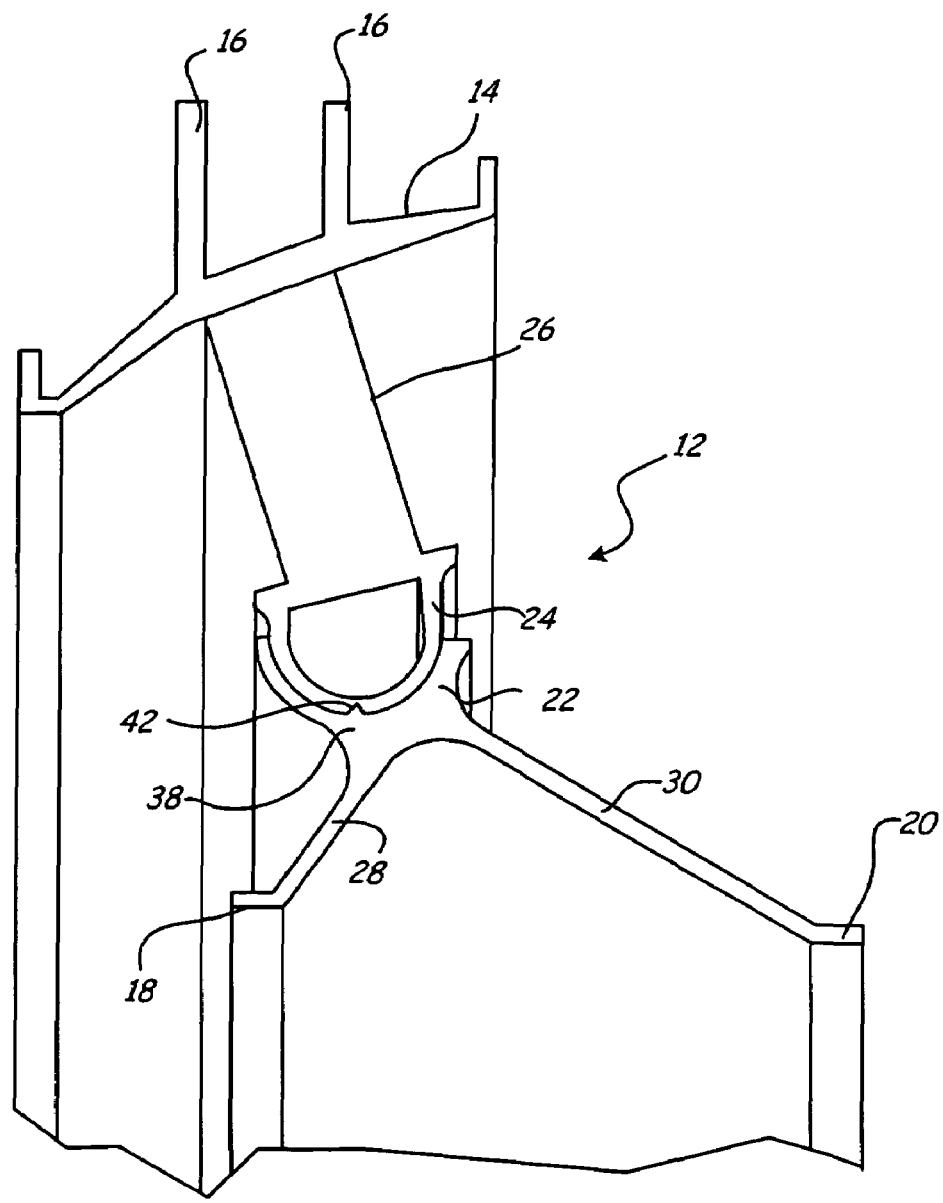
FIG. 7 is a cross-sectional view of the mid-turbine frame.

FIG. 7 shows a cross-sectional view of a segment of mid-turbine frame 12. In operation, the loads from first and second bearings 18 and 20 are transferred through first and second bearing cones 28 and 30, respectively, and combine at load transfer unit 22. Torque boxes 24 are initially positioned within load transfer unit 22 such that contact rib 36 of load transfer unit 22 engages contact groove 40 of torque boxes 24 and locking ribs 38 of load transfer unit 22 engage locking grooves 42 of torque boxes 24. Contact rib 36 and contact groove 40 act as locking mechanisms as well as vertical load transfer mechanisms. Once locked in position, forward and aft rotational movement of the segments of mid-turbine frame 12 are prevented by the axial joints created by the engagement of the interlocking joints of locking ribs 38 and locking grooves 42. The interlocking joints of locking ribs 38 and locking grooves 42, torque boxes 24 remain locked in place until there may be a change in torque due to idle, temperature, or pressure changes. Due to the changes, component parts may expand or bend, causing misalignment relative to the original geometry. This may cause locking grooves 42 of torque boxes 24 to disengage from locking ribs 38, resulting in circumferential motion of torque boxes 24 within load transfer unit 22.

As previously mentioned, although torque boxes 24 cannot move in the axial direction due to the locking mechanism of contact rib 36 and contact groove 40, torque boxes 24 are still adjustable and rotatable in the circumferential direction with respect to load transfer unit 22. The torque loads from first and second bearing cones 28 and 30 are transferred from load transfer unit 22 to torque boxes 24 by the interlocking joints of contact rib 36 and contact groove 40 as well as the interlocking joints of locking ribs 38 and locking grooves 42. Because mid-turbine frame 12 has a segmented design, locking ribs 38 and locking grooves 42 must be engaged in order to form a connected tube or tunnel. Mid-turbine frame 12 must have this connected tubular shape in order to transfer the load from load transfer unit 22 to torque boxes 24.

Because torque boxes 24 can move circumferentially with respect to load transfer unit 22, the load transfer from first and second bearings cones 18 and 20 to load transfer unit 22 and to torque boxes 24 can be adjusted and is thus always equalized. When contact rib 36 engages contact groove 40 and locking ribs 38 engage locking grooves 42, the joints ensure uniform load transfer from load transfer unit 22 to torque box 24. In the case that mid-turbine frame 12 has only a single contact rib 36 and a single contact groove 40 (as shown in FIGS. 4, 5A, and 5B), mid-turbine frame 12 has a single load point transfer from load transfer unit 22 to torque boxes 24. In the case that mid-turbine frame 12 has a plurality of contact ribs 36 and a plurality of corresponding contact grooves 40 (as shown in FIG. 6), mid-turbine frame 12 has multiple loading points from various directions along load transfer unit 22 to torque boxes 24. Because torque boxes 24 can shift within load transfer unit 22, there is a mechanical advantage that allows motion between load transfer unit 22 and torque box 24 to ensure optimum load transfer for a particular concentration.

Torque boxes 24 then carry the combined load to struts 26, which transfer the combined load through to engine casing 14. The U-shape design of both load transfer unit 22 and torque boxes 24 allow efficient load transfer through mid-turbine frame 12 and engine casing 14 to mounts 16. The U-structure is beneficial because of the membrane bending efficiency of the shell structures of load transfer unit 22 and torque boxes 24, reducing the overall weight of mid-turbine frame 12. In addition, because load transfer unit 22 and torque box 24 each have a U-shape, struts 26 may either be tilted or perpendicular with respect to torque box 24 without decreasing the efficiency of load transfer from first and second bearings cones 18 and 20 to engine casing 14. When torque boxes 24 are locked in place within load transfer unit 22, struts 26 are also normal to engine casing 14 and efficiently transfers the loads from torque boxes 24 to engine casing 14.

The mid-turbine frame has a segmented ring structure that efficiently distributes load from a first bearing and a second bearing to a pair of engine mounts. The mid-turbine frame includes a load transfer unit, a plurality of torque boxes, and a plurality of struts. The torque boxes are adjustable and rotatable within the load transfer unit. The load transfer unit of the mid-turbine frame is U-shaped and combines the loads from the first and second bearings before the combined load is transferred to the plurality of torque boxes, which are also U-shaped. The load transfer unit has a circumferential contact rib and a plurality of equally spaced axial locking ribs that are engagable with a circumferential contact groove and axial locking grooves of the torque boxes. When the ribs and the grooves are engaged, they form joints that prevent axial movement and circumferential rotation of the torque boxes within the load transfer unit. The joints also function as vertical load transfer units that efficiently transfer the loads from the first and second bearings from the load transfer unit to the torque boxes. The loads from the torque boxes are then transferred through the plurality of struts to an engine casing.

Although the present invention has been described with reference to preferred embodiments, workers skilled in the art will recognize that changes may be made in form and detail without departing from the spirit and scope of the invention. For example, although in the embodiments shown, grooves 40, 42 are provided on torque boxes 24 and ribs 36, 38 are provided on load transfer unit 22, the locations of the grooves and ribs can be reversed.

The invention claimed is:

1. A mid-turbine frame connected to at least one mount of a gas turbine engine for transferring a first load from a first bearing and a second load from a second bearing to the mount, the mid-turbine frame comprising:
   a load transfer unit for combining the first load and the second load into a combined load, wherein the load transfer unit has a first locking element;
   a torque box rotatably positioned within the load transfer unit, wherein the torque box has a second locking element engagable with the first locking element of the load transfer unit; and
   a plurality of struts connected between the torque box and the mount for transferring the combined load from the torque box to the mount;
   wherein the first locking element is at least one of a rib or a groove and the second locking element is at least one of a rib and a groove.

2. The mid-turbine frame of claim 1, wherein the load transfer unit is U-shaped.

3. The mid-turbine frame of claim 1, wherein the torque box is U-shaped.

4. The mid-turbine frame of claim 1, wherein the load transfer unit has a plurality of first locking elements and the torque box has a plurality of second locking elements.

5. The mid-turbine frame of claim 1, and further comprising a plurality of torque boxes, wherein each of the plurality of torque boxes has a second locking element that is engagable with the first locking element of the load transfer unit.

6. The mid-turbine frame of claim 1, wherein the first locking element of the load transfer unit and the second locking element of the torque box function as a locking mechanism and a vertical load transfer mechanism.

7. The mid-turbine frame of claim 1, wherein the mid-turbine frame has a segmented ring structure.

8. The mid-turbine frame of claim 6, wherein the torque box transfers the combined load from the load transfer unit to the plurality of struts.

9. A mid-turbine frame having multidirectional load transfer for transferring a first load and a second load to an engine casing, the mid-turbine frame comprising:
   a load transfer structure for combining the first load and the second load, wherein the load transfer structure has a first locking element;
   an adjustable torque box for transferring the combined load from the load transfer structure, wherein the adjustable torque box has a second locking element for engaging the first locking element of the load transfer structure;
   a plurality of struts connecting the adjustable torque box to the engine casing;
   wherein the first locking element is at least one of a rib or a groove and the second locking element is at least one of a rib and a groove.

10. The mid-turbine frame of claim 9, wherein the load transfer structure and the adjustable torque box are U-shaped.

11. The mid-turbine frame of claim 9, wherein the load transfer structure has a plurality of first locking elements and the adjustable torque box has a plurality of second locking elements for engaging the plurality of first locking elements of the load transfer structure.

12. The mid-turbine frame of claim 9, wherein the mid-turbine frame has a segmented ring structure.

13. The mid-turbine frame of claim 10, wherein the first locking element of the load transfer structure and the second locking element of the adjustable torque box act as a locking mechanism and a load transfer mechanism.

14. A mid-turbine frame for combining and transferring a first load and a second load from a first bearing and a second bearing, respectively, to an engine casing housing the mid-turbine engine, the mid-turbine engine comprising:
   a load transfer structure having a first locking element for combining and absorbing the first and second loads;
   a torque box having a second locking element for engaging the first locking element of the load transfer structure;
   at least one strut having a first end and a second end, wherein the first end of the strut is connected to the torque box and the second end of the strut is connected to the engine casing, wherein the strut transfers the first and second loads to the engine casing;
   wherein the first locking element is at least one of a rib or a groove and the second locking element is at least one of a rib and a groove.

15. The mid-turbine frame of claim 14, wherein the load transfer structure has a plurality of first locking elements and the torque box has a plurality of second locking elements for engaging the plurality of ribs of the load transfer structure.

16. The mid-turbine frame of claim 14, wherein the load transfer structure and the torque box are U-shaped.

17. The mid-turbine frame of claim 14, wherein the first locking element of the load transfer structure and the second locking element of the torque box act as a locking mechanism and a load transfer mechanism.

18. The mid-turbine frame of claim 14, wherein the torque box is adjustable within the load transfer unit.

* * * * *